(12) United States Patent
Hattori et al.

(10) Patent No.: US 6,202,424 B1
(45) Date of Patent: Mar. 20, 2001

(54) SYSTEM FOR COMPRESSING CONTAMINATED GAS

(75) Inventors: Toshiro Hattori; Fumihiko Kaneko, both of Tokyo (JP)

(73) Assignee: Mayekawa Mfg. Co., Ltd., Tokyo (JP)

( * ) Notice: Subject to any disclaimer, the term of this patent is extended or adjusted under 35 U.S.C. 154(b) by 0 days.

(21) Appl. No.: 09/430,172

(22) Filed: Oct. 29, 1999

(51) Int. Cl.[7] ..................................................... F25D 17/06
(52) U.S. Cl. .................................................. 62/93; 62/179
(58) Field of Search ............................... 62/93, 97, 150, 62/179

(56) References Cited

U.S. PATENT DOCUMENTS

| | | | |
|---|---|---|---|
| 3,854,300 | * 12/1974 | Gerhold | ............................. 62/93 X |
| 4,490,985 | * 1/1985 | Wells | ................................ 62/93 X |
| 6,089,282 | * 7/2000 | Spiegelman et al. | . |

FOREIGN PATENT DOCUMENTS

| | | |
|---|---|---|
| 2253042 | 8/1992 | (GB) . |
| 62-102884 | 6/1987 | (JP) . |
| 63-20600 | 2/1988 | (JP) . |
| 2-45519 | 12/1990 | (JP) . |
| 5-59378 | 3/1993 | (JP) . |
| 5-24880 | 6/1993 | (JP) . |

\* cited by examiner

*Primary Examiner*—Corrine McDermott
*Assistant Examiner*—Chen-Wen Jiang
(74) *Attorney, Agent, or Firm*—Evenson, McKeown, Edwards & Lenahan, PLLC

(57) ABSTRACT

The object of the present invention is to provide a compression system to effectively compress contaminated gas containing water and other corrosive substances (natural gas) without suffering any adverse effects caused by toxic substances, including impurities, and which includes a path which heats the compressor using gas with a low dew-point temperature, such as water free gas or purified gas from outside the system, that is substantially free of water, or discharged gas after having been compressed by the compressor, a separator provided upstream of the suction section of the compressor, which separates water and the like from natural gas by cooling and condensation, and a dew-point maintaining arrangement for maintaining the discharged temperature of gas from the compressor above the dew-point temperature of the compressed gas when compressing natural gas from which water has been separated by the separator and characterized in that, when direct compression of the actual gas (contaminated gas) is necessary, a heating operation is carried out by a gradually increasing the pressure of the gas discharged from the compressor by controlling the suction pressure of the compressor, by adjusting the opening of a pressure control valve on the return pipe, and after the heating operation, the actual compressing operation of natural gas is not affected, and a stable continuous operation is enabled due to a smooth switchover.

11 Claims, 2 Drawing Sheets

SYSTEM FOR COMPRESSING CONTAMINATED GAS

BACKGROUND OF THE INVENTION

1. Field of the Invention

The present invention relates to a system for treating and compressing contaminated gas (water saturated, heavy hydrocarbon natural gas with corrosive impurities etc.) which effectively compresses gas so as to process the contaminated gas into a less polluted, easier to handle and usable gas. Sources of contaminated gas are gas ejected from oilfields etc., off-gas, and vapor-recovery gas etc. discharged from heavy chemical industry facilities.

2. Description of the Related Art

Since natural gas produced along with crude oil from onshore and offshore oil production fields is typically a water saturated, heavy hydrocarbon gas contaminated with corrosive substances such as $H_2S$ (hydrogen sulfide), a system for performing a designated compression for such gas, in a stage prior to refinement or liquefaction, must change the contaminated gas into a more "user friendly" gas without being affected by the aforementioned water etc., so as to enable an effective compression.

However, historically, no where in the market place was there an offered system for compressing or liquefying gas which enabled effective, easy and low-cost compression and liquefaction, without any adverse effects to the system caused by contaminants, $H_2S$, water and the like. For this reason, such contaminated natural gas was turned in the atmosphere at plant flare of a platform.

Obviously, since such burning and releasing impurity rich natural gas into the atmosphere are recognized as factors contributing to environmental pollution, and recently there has been a growing requirement to be able to easily compress or liquefy such natural gas, without suffering any adverse effects from the water and the like, and to make good use of the gas as an energy source, and resources.

For example, an invention disclosed in Japanese Patent Publication No. 5-59378 A is a technique of producing liquefied gas from unprocessed gas effusing from small offshore oil and gas production fields by separating the gas from liquid and solid materials, drying the gas, and cooling to liquefy the gas under pressure.

As for a liquid separating means, a drum liquid separator, as disclosed in published Japanese Unexamined Utility Model Application No. 63-20600, is well known to the public.

In published Japanese Examined Utility Model Application No. 2-45519, a volumetric oil injection type compressor, more specifically an oil injection type screw compressor used at Freon gas plants and COG (coke oven gas) refinement plants, is disclosed.

However, no technique has been disclosed where a compressing system effectively compresses contaminated gas with water, etc., (hereafter referred to as natural gas) such as natural gas, off-gas, and vapor-recovery gas without suffering from any adverse effects of toxic substances, including impurities, in the natural gas.

SUMMARY OF THE INVENTION

The present invention has been conceived to directly address the scenarios described above, and it is accordingly an object of the present invention to provide a compression system to effectively compress natural gas without suffering from any adverse effects caused by toxic substances, including impurities.

To achieve the object mentioned above, the present invention is a system for compressing contaminated gas (hereafter referred to as natural gas), which effectively compresses contaminated gas including water or natural gas contaminated with corrosive substances and saturated water, comprising a path which heats a compressor, using a gas with a low dew-point temperature, such as water free gas or purified gas from outside the system, that is substantially free of water, or discharged gas after being compressed by the compressor;

a separator provided upstream of the suction section of the compressor, which separates water and the like from natural gas by cooling and condensation; and a means for maintaining the temperature of gas discharged from the compressor above the dew-point temperature of the compressed gas, when compressing natural gas from which water etc. has been separated by the separator, wherein a heating operation is performed using gas with a low dew-point temperature, such as discharged gas which has been compressed by the compressor, or water-free gas and purified gas, whereas contaminated gas contaminated with water, etc. is not sucked into the system while using said path during the heating operation.

The path which performs the heating operation may be a bypass pipe which is arranged to connect the system discharge line (including a non-return valve) to the inlet side of the compressor on the downstream side of the suction block valve, or the path may be a return pipe which returns gas from outside the system to the inlet side of the compressor.

In a concrete manner, an outlet of the bypass or return pipe is connected to a point located downstream of a shut-off valve, which introduces natural gas and the like to the compressor, and in this case, during the heating operation of the compressor, the shutoff valve is closed, so that only gas used for the heating operation is supplied.

Moreover, when providing gas for the heating operation through the heating path, a gradual rise in the compressor discharge pressure is enabled by controlling the suction pressure of the compressor by adjusting an opening of a valve on the heating operation path.

A temperature controller for the bypass gas is provided, when the path that performs a heating operation is the bypass line which recycles a portion of the compressed gas.

Furthermore, in a compression system using an oil injecting type compressor, a dew-point maintenance means is provided by controlling the temperature of discharged gas by temperature control of the injected oil. More specifically, the compressor is an oil injecting type compressor, and in a system for compressing gas equipped with an oil separator which separates oil from the oil-mixed compressed gas discharged from the compressor, a dew-point maintenance means is provided in an oil circulation path which connects an oil storage section in the separator and an oil injecting site in the compressor.

A temperature controller, such as a refrigerator which is capable of adjusting the temperature of the natural gas at the suction end of the compressor, is provided upstream of the separator.

According to the present invention, the operating life of the compressor may be extended, since a natural gas operation is performed after the operation of the compressor by gas with a low dew-point temperature, such as compressed gas discharged from the compressor, or inert gas like $N_2$ gas, water-free gas, and purified gas, which prevents interference with the operation of a compressor caused by water and other contaminants within the natural gas during heating operation.

Moreover, during the heating operation of the compressor, condensation of the discharged gas may be prevented by adjusting an opening of a valve on the bypass which opens and shuts the bypass pipe where the gas for heating operation flows, and controlling the suction pressure of the compressor, which enables a gradual rise in the pressure of the discharged gas, so that an excess rise of the dew-point temperature of the discharged gas is relieved.

Also, according to the present invention, by carrying under temperature control stored oil within the separator of a discharging side to the compressor via a circulation pipe, and by injecting temperature controlled oil into the compressing chamber, the temperature of the gas discharged from the compressor is maintained above the dew-point temperature, so as to prevent damage to the function and durability of the compressor caused by residual water, etc. in the natural gas.

Furthermore, lubrication of the compressor is well maintained by an oil purifying means provided on the circulation pipe, which enables cleaned oil to be supplied to the compressor at all times.

By means of the aforementioned controls, condensation and liquefaction of any of the contaminated gas compounds is avoided, and seizing of bearings, and obstruction of the function of the compressor, induced by liquefied natural gas entering the compressor together with oil, is prevented.

Meanwhile, by cooling contaminated gas, and condensing the water vapor, and other vapors such as corrosive gas, heavy-hydrocarbons, sulfides, and other substances useless as fuel, or substances having adverse effects on the function of the system can easily be removed from gas stream, and it is possible to significantly decrease the content of these toxic substances in the gas stream prior to entering the compressor.

The following discloses preferred embodiments of systems for compressing natural gas, however, the present invention may be applied to systems for compressing a wide range of contaminated gases, such as apparatus for compressing water-containing off-gas from heavy chemical industry facilities.

DETAILED DESCRIPTION OF PREFERRED EMBODIMENTS

Figure 1:
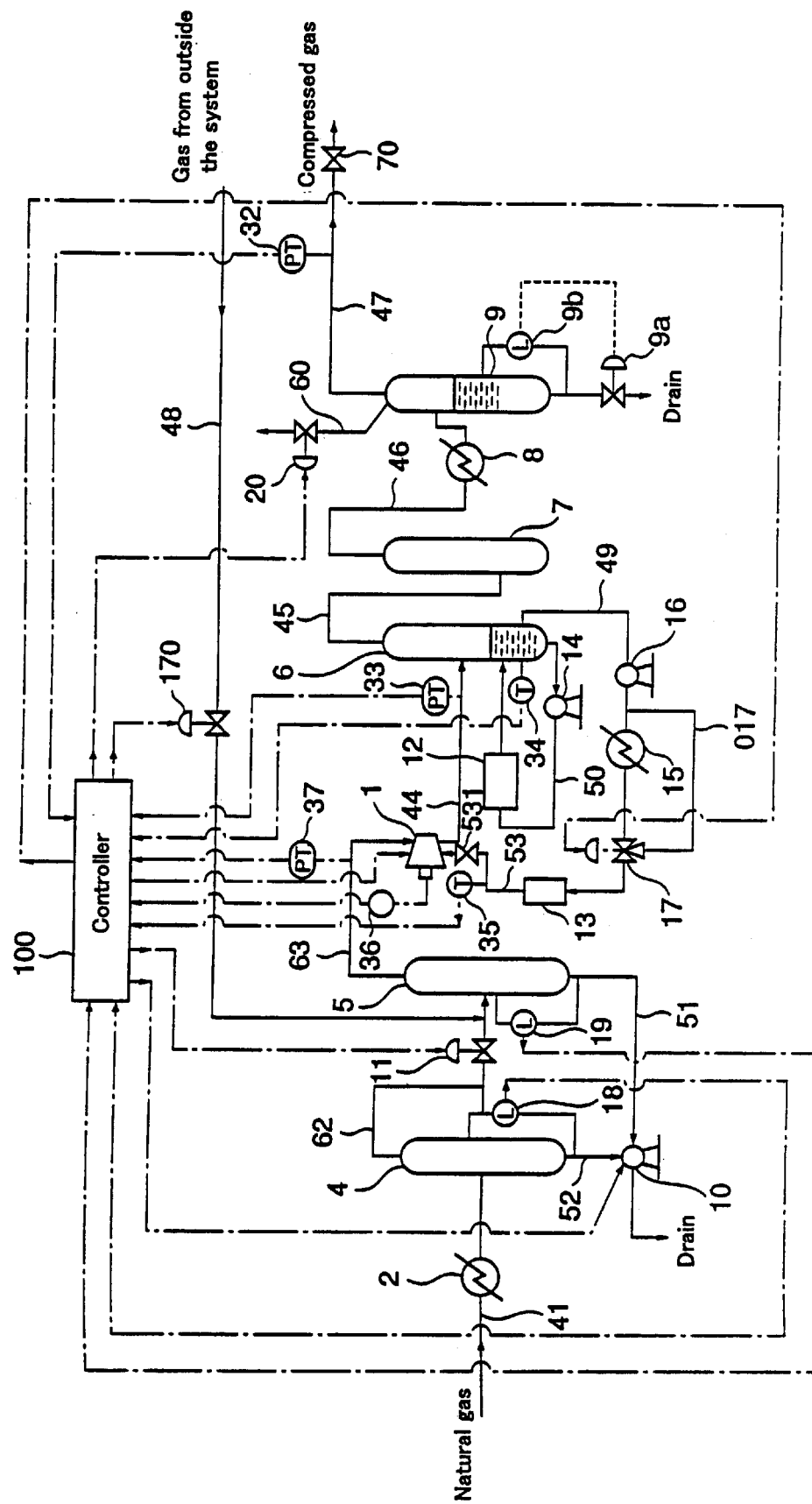
FIG. 1 is a flow diagram showing the construction of a first embodiment of a system according to the present invention for compressing natural gas.

The following is a detailed description of preferred embodiments of the present invention, which are systems for compressing natural gas, which is a water saturated, heavy hydrocarbon gas contaminated with corrosive substances. It is intended, however, that the dimensions, material, and configuration of component parts and their relative positions and the like in the following description and in the drawings shall be interpreted as illustrative only and not as limiting the scope of the present invention.

First, the heating operation, which is the main point of the present invention, will be explained. As described above, the first point of the present invention is to operate compressor 1 using gas for heat operation, such as compressed gas from downstream or an inert gas, which is supplied via return pipe 48, while an operation using actual natural gas (actual gas operation) is suspended, during the process of start-up to heat up the screw-type compressor 1.

That is, as described in the following embodiments, although contaminants such as water, and hydrocarbons are removed from natural gas by drain separator 4 and knock-out drum 5 upstream of the compressor, if the natural gas is supplied directly into compressor 1 and is compressed, it is highly possible for the gas to induce malfunctions of the compressor, since during the process of compression, contaminants such as water and heavy hydrocarbons from the natural gas condense or liquefy within the compressor.

To avoid such a malfunction, at the initial stage of the heating operation of the present invention, natural gas is not introduced immediately after the start-up of the screw type compressor 1. Instead, gas used for heating operation, such as inert gas, is brought in from outside the system via return pipe 48, as shown in FIG. 1, or compressed gas from downstream of bypass pipe 148 shown in FIG. 2, is returned into the inlet of knock-out drum 5, and passes through knock-out drum 5 before being supplied to screw-type compressor 1, while a shutoff valve 11 for introducing natural gas, located upstream of the compressor 1, is in the closed condition.

More specifically, in FIG. 1, a pressure control valve 170 is provided in a return pipe 48, and while conducting a heating operation of the compressor, a controller 100 closes shutoff valve 11 and opens pressure control valve 170 on return pipe 48, so as to supply heating gas to compressor 1.

Malfunctions of the compressor induced by condensation of water during the heating operation, are still more effectively prevented by conducting the heating operation such that the suction pressure of compressor 1 is controlled through an adjustment of an opening of the pressure control valve 170 on return pipe 48, so as to gradually raise the pressure of the gas discharged from the compressor 1.

Figure 2:
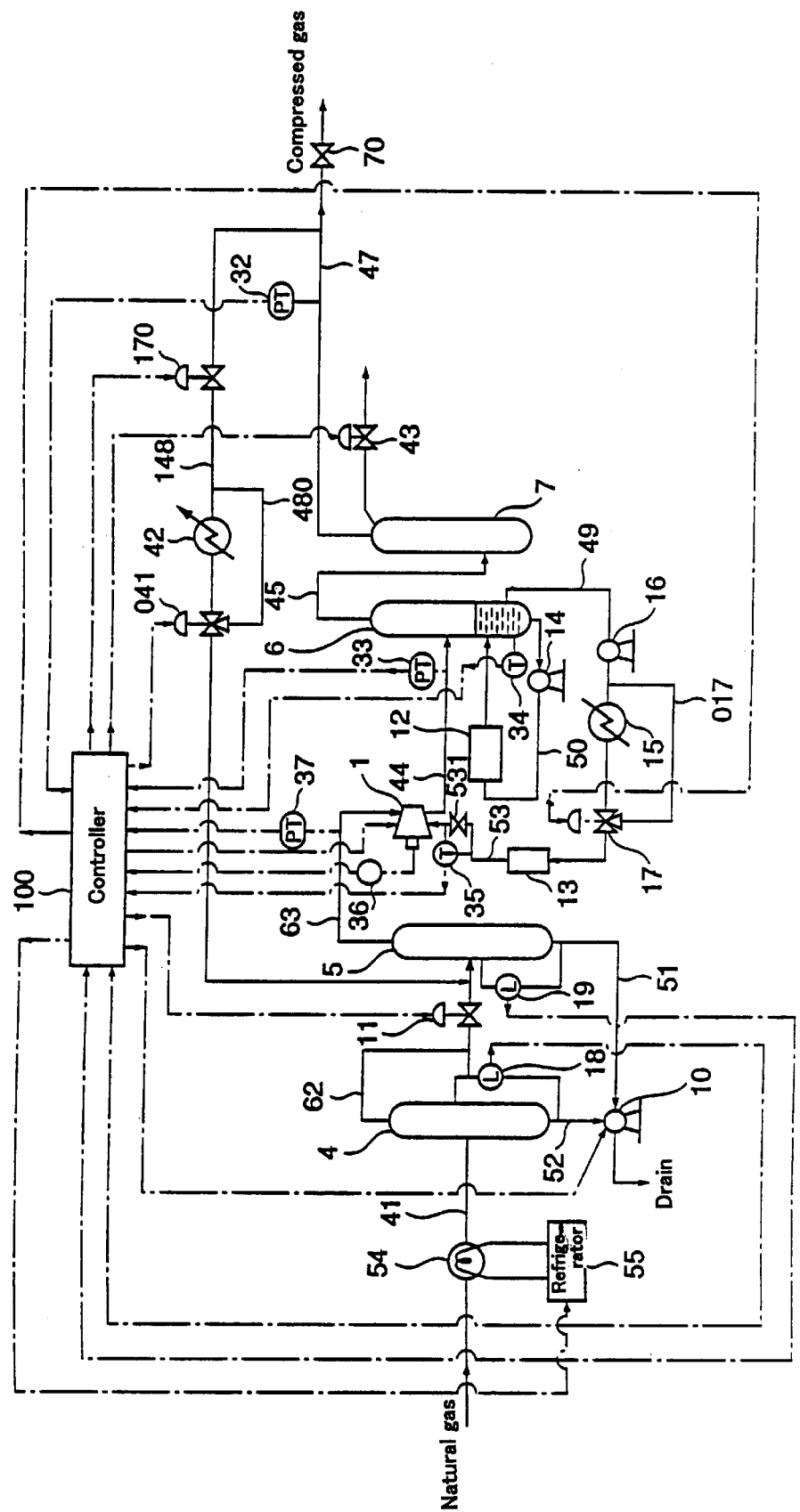
FIG. 2 is a flow diagram showing the construction of a second embodiment of a system according to the present invention for compressing natural gas.

In a case where gas from outside the system is not used, as shown in FIG. 2, a shutoff valve 70, for example a non-return valve, is provided at the outlet of a gas conveyor pipe 47 extended from a second separator 7 on the discharge side of compressor 1, or in other words, at an inlet of a pipe from outside the system. A bypass pipe 148 bypasses between the upstream side of the shutoff valve 70 and the inlet side of compressor 1. On the bypass 148, a pressure control valve 170, a gas cooler 42, and a temperature adjustment three-way valve 041, are placed. Also, a bypass 480 is provided between the inlet side of gas cooler 42 and temperature adjustment valve 041.

A heating operation is conducted by supplying gas from upstream to the compressor 1 by opening the shutoff valve of the compressor.

Compressor malfunctions induced by condensation of water during the heating operation are still more effectively prevented by controlling the suction amount of returned compressed gas from compressor 1 by adjusting the opening of the pressure control valve 170 on the bypass pipe 148 based on a compressor suction pressure detection signal so as to gradually increase the pressure of the gas discharged from the compressor during the heating operation.

Further, based on the detected value from the gas temperature detector, if the temperature of the compressed gas is high, the gas is directed to flow into gas cooler 42 by temperature adjustment valve 041, and cooled compressed gas is directed to the inlet of knock-out drum 5 upstream of compressor 1.

Meanwhile, if the temperature of the compressed gas is low, the gas is directed to flow into bypass 480 by temperature adjustment valve 041, and is directed to a point upstream of the compressor 1 without cooling.

With these operations, during the heating operation using gas from bypass 148 in compressor 1, the temperature of the gas supplied to compressor 1 is equalized so as to be at a standard temperature at all times.

Also, according to the present invention, the dew-point temperature of the discharged gas is controlled to prevent malfunctions induced by condensation or liquefaction of water and hydrocarbons in the gas compressed by the screw-type compressor 1, during the process of compression or at the discharge.

This is the second main point of the present invention.

As shown in FIG. 1 and FIG. 2, by detecting the temperature of oil provided to compressor 1 using temperature detector 35, and based on the temperature detecting signal, an oil temperature control valve consisting of a three-way valve 17 is controlled, and a mixing ratio of the amount of oil from an oil cooler 15 and oil from a bypass path 017 which bypasses the oil cooler 15 is controlled so that the dew-point temperature of the discharged gas is controlled via controlling the temperature of the oil injected into compressor 1.

Therefore, the control of the dew-point temperature of the discharged gas prevents condensation and liquefaction of water etc. within compressor 1 by maintaining the temperature of the discharged gas (dew-point temperature of discharged gas+α) from the compressor above the dew-point temperature of the discharged gas (changeable at approx. α=20° C.), and when the temperature of the discharged gas decreases below that temperature (dew-point temperature of discharged gas+α), based on the temperature of a temperature detector 34 at the exit of compressor 1, the temperature of the discharged compressed natural gas is raised by increasing the oil temperature by heating the oil via an oil heater (not shown in drawing) in the first oil separator 6, or by controlling the temperature of oil supplied from the oil injecting section of compressor 1.

By controlling the dew-point temperature of discharged gas, condensation and liquefaction of water and hydrocarbon gas in the discharged gas are avoided as described above, since the temperature of the discharged gas rises in proportion to the oil temperature directed into compressor 1. Thus, malfunctions of compressor 1 induced by these liquefied contents, and burning of bearings induced by oil entering the compressor 1, are prevented.

In addition, in oil circulation pipes 49 and 53, there may be a construction in which a heater is provided parallel to the oil cooler 15. When the temperature of the oil is low, the operation of oil cooler 15 is suspended, while the heater and bypass pipe 017 are activated by oil temperature adjustment valve 17.

Control of the dew-point temperature of the discharged gas is still more effective when started at the time of the heating operation, which is initiated after start-up of the screw-type compressor 1.

That is, as mentioned below, after the start-up of compressor 1, gas used for heating operation, such as an inert gas from outside the system or compressed gas from the downstream side, is supplied to the suction side of compressor 1 via return pipe 48 or bypass pipe 148. Especially in a case where gas from upstream is introduced into compressor 1 via natural gas conveyor pipe 41, accompanying the rise of the pressure of the discharged gas after the start-up of the compressor 1, the dew-point temperature of the discharged gas also rises, and there is a possibility that water, etc. within the discharged gas may condense at the discharge side.

Therefore, condensation of water etc. within the discharged gas is avoided by controlling the suction pressure of compressor 1 by adjusting the opening of the pressure control valve 170, and by gradually raising the discharge pressure so as to relieve a rise in the dew-point temperature of the discharged gas.

The control of the dew-point temperature of the discharged gas may also be effected by adjusting the oil temperature control valve to control the mixing ratio of the oil from oil cooler 15 and from bypass pipe 017, in response to a detecting signal from an oil temperature detector 34 within the first separator 6.

Further, if the oil temperature is low, a heater may be set to heat the oil within the first separator 6, and the degree of heating by the heater is controlled based on the aforementioned temperature detecting signal so that the oil temperature within the first separator 6 may be controlled so that its discharging temperature becomes the dew-point temperature of the discharged gas+α.

After the heating operation, when the operation is switched to actual compression of natural gas, while controlling the temperature of the discharged gas to be at the dew-point temperature of the discharged gas+α, by moving the compressor slide valve, the load of the compressor is made to continuously correspond to the work load in order to initiate the actual compression of natural gas without any difficulties.

Preferred embodiments of the present invention will now be described with reference to the accompanying drawings.

(The first embodiment)

FIG. 1 is a flow diagram showing the construction of a first embodiment of a system for compressing natural gas according to the present invention.

In FIG. 1, a natural gas transporting pipe 41 transports natural gas separated from crude oil and is equipped with a pre-gas cooler 2, which cools the natural gas to a designated temperature and cools and condenses water vapor, etc. in the natural gas, and a drain separator 4, which is connected downstream of the pre-gas cooler 2. The pre-gas cooler 2 is a heat exchanger that cools and condenses water vapor, etc. in the natural gas by exchanging heat with a cooling medium such as cooling water, brine, refrigerant, or the like.

The drain separator 4 separates the drain substances, such as condensed water, from the natural gas, which has been cooled to a designated temperature in pre-gas cooler 2, and drain pipe 52 and drain pump 10 discharge separated drain substances.

After removing drain substances in said drain separator 4, the natural gas is directed into the knock-out drum 5 via gas transporting pipe 62 and shutoff valve 11.

Level transmitter 18 detects the drain level in the drain separator 4, and signals from level transmitters 18 and 19 are sent to controller 100, which controls the drive of drain pump 10 and shutoff valve 11.

The knock-out drum 5 separates foreign substances such as particles (solid wastes), mist, liquids, and water from the natural gas which has passed the drain separator 4. Outlet duct 51, provided at the bottom of the knock-out drum, discharges the separated water etc. and is connected to an inlet of the drain pump 10.

Moreover, an outlet end of return pipe 48 opens between the outlet of the shutoff valve 11 and the inlet of the knock-out drum 5, where gas from outside the system is taken in via a pressure control valve 170, and a heating operation is conducted.

After the heating operation, the natural gas from the gas exits from the top of knock-out drum 5, passes through gas transporting pipe 63 and is introduced into the screw type compressor 1, and the designated compression (actual compressing operation of natural gas) is performed.

Screw-type compressor 1 is a well-known oil injection-type screw compressor, and oil separated at the first separator 6, which separates compressed gas and oil, is introduced via oil circulation pipes 49 and 53 and is injected into the bearing portion of compressor 1.

Also, the first separator 6 effects a rough separation of the oil from a mixture of oil and compressed natural gas discharged from screw compressor 1. Oil circulation pipes 49 and 53 recirculate separated oil to the oil injecting section of the screw compressor 1.

Oil pump 16 circulates oil separated in the first separator 6 to the side of screw compressor 1 through oil circulation pipes 49 and 53. Oil cooler 15 cools the recircluated oil, and oil filter 13 filters out solid substances from the oil.

A three-way valve 17 controls the temperature of the oil injected into the oil injecting section of compressor 1 to control the dew-point temperature of discharged gas as described below. A bypass is formed through pipe 017. An oil purification pipe 50 is connected to first separator 6 and is formed so as to circulate oil from the oil storage section of the lower part of first separator 6 through an oil purification device 12. That is, the oil pipe 50 is equipped with an oil purification device 12, which purifies oil from first separator 6 before supplying oil to the screw compressor 1, and with an oil pump 14, which circulates the purifying oil.

Discharged gas, separated from the oil by the first oil separator 6, is directed into the second separator 7 via gas transporting pipe 45.

The second separator 7 functions as a precision oil separator, which further separates and removes residual oil from the discharged gas roughly separated at the first separator 6, and also functions as a buffer, which relieves the pressure fluctuations of the gas discharged from the screw compressor, together with the first separator 6, and is especially effective during the heating operation.

Compressed gas, from which oil has been removed by the second separator 7, is directed into after-gas cooler 8 via gas transporting pipe 46. After being cooled by after-gas cooler 8, the gas is directed into the second drain separator 9 as compressed gas containing re-condensed oil, and further oil and water, etc. are removed.

In other words, the second drain separator 9 separates water, residual oil, and corrosive substances from gas, from which oil has been removed by the second separator 7, by cooling down the gas by after-gas cooler 8, and thus re-condensing water and oil etc. in the discharged gas.

A purge pipe 60 is connected to an upper part of drain separator 9, and whenever necessary, purges gas within said separator 9 as well as gas from the discharge path of the compressor. A purge valve 20 for opening and shutting is arranged on purge pipe 60.

A pressure/temperature detector 32 detects the pressure and temperature of the compressed gas within gas transporting pipe 47, which transports gas from the second drain separator 9. A pressure/temperature detector 33 detects the pressure and temperature of the discharged gas from screw compressor 1, and a pressure/temperature detector 37 detects the pressure and temperature of the gas being sucked in by screw compressor 1. Also, a temperature detector 34 detects the temperature of accumulated oil within the first separator 6, and temperature detector 35 detects the temperature of oil supplied to screw compressor 1. The control of the aforementioned heating operation, the control of the dew-point temperature of the discharged gas, and the control of the compressing operation, are carried out according to these pressure and/or temperature detectors 32, 33, 34, 35 and 37.

In pressure and temperature detectors 37, 32, 33 and temperature detectors 34, and 35, the temperature and pressure of the gas and the temperature of the oil at both the inlet and outlet sides of compressor 1 are measured. Based on the detected values, the temperature of the oil injected into compressor 1 is controlled, in order to control the dew-point temperature of the discharged gas, and the bypass operation is controlled by opening and shutting gas pressure control valve 170 in order to control the heating operation.

A potentiometer 36 detects the location of the slide valve, which controls the capacity of compressor 1. Controller 100, controls the suction pressure or the pressure of the gas discharged from compressor 1 by comparing the location of the slide valve with the pressure at the inlet or outlet side of compressor 1.

Controller 100 receives input signals from each of the pressure/temperature detectors 32, 33, and 37, temperature detectors 34 and 35, and potentiometer 36. Further, controller 100 is inputted with a signal from level transmitter 18 indicating the liquid level in drain separator 4, and with a signal from level transmitter 19 indicating the liquid level in knock-out drum 5. Controller 100 then outputs control signals to the screw compressor 1, shutoff valve 11, drain pump 10, oil temperature control valve 17, purge valve 20 and gas pressure control valve 170. The structure of controller 100 will be described later.

The actual operation of the system for compressing natural gas will now be described.

As described above, the heating operation is conducted, when initiating the operation of the compressor, by first closing the shutoff valve 11 while opening the pressure control valve 170 of return pipe 48 and then supplying gas designated for heating operation to the compressor 1.

After completion of the heating operation, high temperature natural gas separated from crude oil is directed by the opening of shutoff valve 11 to pass via natural gas transporting pipe 41 into pre-gas cooler 2, and is cooled, whereby water, etc. contained in the natural gas is condensed. During condensation by cooling of the gas, corrosive gases, such as $H_2S$, in the natural gas, heavier hydrocarbons, such as tar, and other contaminants are reduced from the gas as drain substances. Since a drain separator 4 is disposed at the outlet side of the pre-gas cooler 2, heavy oil contents such as saturated water, $H_2S$ gas, and heavier hydrocarbons are separated from the natural gas in drain separator 4 and are discharged outside the system by the drain pump 10 via drain pipe 52.

Gas, from which water and other foreign substances have been separated in drain separator 4, is directed into knock-out drum 5 via shutoff valve 11, and here, water, liquids, mist, contaminants, and other particles are once again separated from the gas. Separated substances (water etc.) are discharged outside the system together with drain substances by drain pump 10 through drain pipe 51.

The liquid level in drain separator 4 is detected by level transmitter 18, and the liquid level in knock-out drum 5 is detected by level transmitter 19. Based on these detected signals from transmitters 18 and 19, the controller 100 outputs signals to control the drive of drain pump 10, and the liquid level in drain separator 4 and knock-out drum 5 are controlled.

Also, in a case where a large amount of gas and liquids enter knock-out drum 5 due to a sudden change in the supply of natural gas upstream of the system, the level transmitter 19 detects the increase of liquid level in the knock-out drum 5, and sends a signal to the controller 100, whereupon the controller 100 conducts an emergency shutoff of the shutoff valve 11, thus blocking the massive inflow of gas and liquids to compressor 1 and protecting the compressor 1. Further, the operation of the compressor is not suspended. Instead the compressor resumes the heating operation during this standby period.

Gas, from which water and other foreign substances have been removed by knock-out drum 5, is directed via gas transporting pipe 63 into screw compressor 1, where designated compression is performed.

In screw compressor 1, oil is injected into the compression chamber between the male rotor and the female rotor (space between the rotors), so that the oil is compressed with the gas.

Oil-containing compressed gas, which has been compressed within compressor 1, is sent to the first separator 6 via gas transporting pipe 44. In the first separator 6, oil is roughly separated from oil-containing gas discharged from the compressor 1, and is stored in the lower section.

Oil accumulated in the first separator 6 is sent to an oil purification device 12 via oil purification pipe 50 by an oil pump 14, and heavy oil substances such as contaminants and tar, and water that have transferred into the oil from natural gas are removed, and the purified oil is returned to first separator 6.

Accordingly, as will be described later, oil supplied from first separator 6 to screw compressor 1 is purified at all times. This extends the life of the lubricating oil and bearings, which in turn enables long-term continuous operation of the screw compressor 1.

Further, stored oil within the first separator 6, which has been purified by oil purification device 12, is passed by oil pump 16 through oil circulation pipes 49 and 53, and is injected into the space between the rotors in screw compressor 1 and functions as a coolant, a lubricant, and a sealant.

In this circulation path, the oil is sent by oil pump 16 via oil circulation pipe 49 and cooled in oil cooler 15 and is sent via a three-way oil temperature control valve 17 to an oil filter 13 in which solids such as particles are filtered out. This oil is injected into the space between the rotors within the screw compressor 1 via an oil flow adjustment valve 531.

Therefore, if a certain amount of oil is stored in the first separator 6, the oil may be maintained in a purified condition at all times by an oil purification device 12. Oil pump 16 supplies cooled oil from oil cooler 15 to the oil injecting section of compressor 1 via oil circulation pipes 49 and 53, while oil temperature control valve 17 and bypass 017 control the oil temperature. Accordingly, it is possible to control the temperature of the gas discharged from compressor 1, or in other words, it is possible to control the dew-point temperature of the discharged gas. In some cases, the oil flow adjustment valve 531 is used to control the dew-point temperature of the discharged gas.

Compressed natural gas, from which oil is roughly separated by the first oil separator 6, passes through gas transporting pipe 45 into the second oil separator 7, in which residual oil is further separated and removed. The compressed gas then passes through gas transporting pipe 46 into the after-gas cooler 8. Here, the gas is cooled, and remaining water in the natural gas, resulting from the compression, is condensed.

The cooled compressed gas containing condensed water etc. is sent to the second drain separator 9, in which the condensed water and residual oil, which have passed through the first separator 6 and second separator 7, are separated.

This drain in second drain separator 9 is discharged by opening drain valve 9a when the liquid amount has passed above the designated amount, based on the level detecting signal of level transmitter 9b.

In the foregoing processes, compressed natural gas is supplied via gas transporting pipe 47 to places of usage, and whenever necessary, further processing such as liquefaction is carried out.

Further, when the operation of the compressor 1 is suspended, the controller 100 opens the purge valve 20, and purges the gas at the discharge side of compressor 1. Then, a pressure detector 33 confirms the achievement of a pressure reduction. By these means it is possible at the time of suspension to prevent condensation of water and higher hydrocarbons from the natural gas at the outlet of compressor 1.

According to this embodiment, the gas suction pressure of compressor 1 is detected by the pressure and temperature detector 37, and the gas discharge pressure is detected by the pressure and temperature detector 32, from which signals are inputted into controller 100. Controller 100 outputs signals so as to control the pressure of gas from outside the system by means of an outside gas pressure control valve 170 when the shutoff valve 11 is closed until both the suction and discharge pressure and temperature meet the condition of the actual compressing operation of the natural gas. When this condition is met, the designated heat operation is conducted by supplying compressor 1 with gas from outside the system via return pipe 48 and knock-out drum 5.

Therefore, when both the gas suction and discharge pressure and temperature of the compressor meet the conditions for an actual compressing operation of natural gas, the controller 100 outputs signals to open the shutoff valve 11 and to control the capacity of the compressor 1 through a slide valve, and the actual compressing operation of natural gas is initiated.

(The second embodiment)

FIG. 2 is a flow diagram showing the construction of a second embodiment of a system for compressing natural gas according to the present invention.

In the second embodiment as shown in FIG. 2, a cooler 54 connected to a refrigerator 55 that is controlled by a controller 100 is disposed on a natural gas transporting pipe 41.

Also, as in the first embodiment described above, a bypass pipe 148, which returns compressed gas to the suction side of the compressor (in a concrete manner, at the outlet of shutoff valve 11), branches off from the gas transporting pipe 47, and is connected to a location between shutoff valve 11 and knock-out drum 5. In addition to the pressure control valve 170 as shown in FIG. 1, bypass pipe 148 is equipped with a three-way temperature adjustment valve 041, and a gas-cooler 42 located between the temperature adjustment valve 041 and the pressure control valve 170.

A bypass path 480 bypasses the gas cooler 42 and is connected to one of the valve openings of the three-way temperature adjustment valve 041. The temperature adjustment valve 041 and the pressure control valve 170 are controlled by controller 100.

In the second embodiment, based on the temperature of the gas sucked into the compressor 1, which is inputted into controller 100 from gas pressure and temperature detector 37, which detects the pressure and temperature of gas sucked into screw compressor 1, the controller 100 outputs operation control signals to refrigerator 55. That is, the controller 100 increases the power of refrigerator 55 when the temperature of the gas sucked in rises higher than the designated value, so as to increase the degree of cooling of cooler 54.

Accordingly, the temperature of the gas which is directed into the suction port of compressor 1 via natural gas transporting pipe 41, drain separator 4 and knock-out drum 5 may be kept at a designated value.

Therefore, when the supply temperature of natural gas containing corrosive substances is excessively high, by increasing the power of refrigerator 55, the temperature of the gas sucked into compressor 1 falls, which makes the environment of compressor 1 anti-corrosive, or in other words, the activation of corrosive gas, such as $H_2S$, found in natural gas is suppressed, and malfunctions of the compressor 1 due to corrosion are prevented.

Other than the aforementioned structure and function, the second embodiment is identical to the first embodiment, and the same components of the invention are identified by the same reference numerals.

What is claimed is:

1. A system for compressing a gas contaminated with at least one impurity selected from the group consisting of water, $H_2S$ and heavy hydrocarbons, said system comprising:

a screw compressor for compressing gas;

a gas supply line for supplying gas to be compressed said screw compressor;

a cooling apparatus arranged on said gas supply line for cooling gas supplied through said gas supply line;

a condensate separator on said gas supply line downstream of said cooling apparatus for separating condensed contaminants from cooled gas supplied through said line;

a flow control valve for regulating flow of gas through said supply line;

an outlet line for compressed gas from said compressor;

an oil separator on said outlet line for separating oil from compressed gas discharged by said compressor;

an oil supply line leading from said oil separator to said screw compressor for supplying oil back to said screw compressor;

temperature control apparatus on said oil supply line for regulating the temperature of oil supplied to said screw compressor;

a clean gas line for introducing a clean gas into said gas supply line between said flow control valve and said compressor;

a regulating valve for regulating flow of clean gas through said clean gas supply line; and a controller for controlling said flow control valve, said cooling apparatus; said temperature control apparatus and said regulating valve; said controller closing said flow control valve and opening said regulating valve when said system is started to heat said compressor to a temperature above the dew point temperature of contaminated gas and then closing said regulating valve and opening said flow control valve to switch said system to compression of the contaminated gas; and said controller controlling at least one of said cooling apparatus and said temperature control apparatus to maintain the compressed gas at a temperature above its dew point.

2. A system according to claim 1, wherein said clean gas line is connected to an outside source of clean gas having a dew point lower than that of the contaminated gas to be compressed.

3. A system according to claim 1, wherein said clean gas line is a recycle line connected to said outlet line for returning a portion of gas compressed by said compressor to the compressor.

4. A system according to claim 3, further comprising means on said recycle line for controlling the temperature of compressed gas returned to said compressor.

5. A system according to claim 4, wherein said temperature controlling means comprises a gas cooler on said recycle line, a bypass line communicating with said recycle line upstream and downstream of said cooler, and a valve for apportioning a flow of gas between said cooler and said bypass line.

6. A system according to claim 1, further comprising a compressor slide valve for regulating the supply of gas to said compressor; said slide valve gradually increasing the supply of gas to be compressed to the compressor when said system is switched to compression of the contaminated gas while the temperature of the compressed gas discharged by the compressor is maintained above its dew point.

7. A system according to claim 1, further comprising a purge line communicating with said outlet line and a purge valve on said purge line; said purge valve being connected to said controller, and said controller opening said purge valve to release condensible gases from said compressor and outlet line when operation of said compressor is suspended, whereby damage to the compressor is prevented and re-starting of the compressor is facilitated.

8. A system according to claim 1, further comprising an oil purification device communicating with said oil separator for purifying oil separated from compressed gases before recycle of said separated oil to the compressor.

9. A system according to claim 1, wherein said contaminated gas is natural gas.

10. A system according to claim 1, wherein the temperature of the compressed gas is maintained above its dew point by regulating the temperature and amount of oil injected into the compressor.

11. A system according to claim 1, wherein the contaminated gas is compressed directly during heating of said compressor, and a valve controlling the flow of gas to the compressor is adjusted during said heating to control the screw compressor inlet suction pressure such that the pressure of the compressed gas gradually increases while maintaining the compressed gas above its dew point.

* * * * *